(12) United States Patent
Carelli et al.

(10) Patent No.: US 6,619,026 B2
(45) Date of Patent: Sep. 16, 2003

(54) REHEAT COMBUSTOR FOR GAS COMBUSTION TURBINE

(75) Inventors: Eric V. Carelli, Greensburg, PA (US); Richard D. Holm, Pittsburgh, PA (US); Thomas E. Lippert, Murrysville, PA (US); Dennis M. Bachovchin, Delmont, PA (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/940,769

(22) Filed: Aug. 27, 2001

(65) Prior Publication Data

US 2003/0037533 A1 Feb. 27, 2003

(51) Int. Cl.[7] ................................................ F02C 3/16
(52) U.S. Cl. ........................................ 60/39.17; 60/735
(58) Field of Search ................................ 60/39.17, 735, 60/37.465, 736

(56) References Cited

U.S. PATENT DOCUMENTS

| | | | | |
|---|---|---|---|---|
| 2,479,777 A | * | 8/1949 | Price | 60/39.17 |
| 2,981,066 A | * | 4/1961 | Johnson | 60/735 |
| 4,197,700 A | * | 4/1980 | Jahnig | 60/735 |
| 5,003,766 A | | 4/1991 | Paul | |
| 5,073,083 A | | 12/1991 | Guyon | |
| 5,490,377 A | | 2/1996 | Janes | |
| 5,581,997 A | | 12/1996 | Janes | |
| 5,590,518 A | | 1/1997 | Janes | |
| 5,881,549 A | | 3/1999 | Janes | |
| 2001/0047648 A1 | * | 12/2001 | Griffiths | 60/735 |

* cited by examiner

*Primary Examiner*—Louis J. Casaregola

(57) ABSTRACT

A combustion turbine with a secondary combustor is provided. The secondary combustor is disposed within the turbine assembly of the combustion turbine. The secondary combustor assembly is structured to maintain the working gas at a working temperature within the turbine assembly. The secondary combustor assembly re-heats the working gas by injecting a combustible gas into the working gas. The secondary combustor assembly includes a plurality of openings disposed among the vanes and/or blades in the turbine assembly which are coupled to a combustible gas source. As the combustible gas is injected into the working gas, the combustible gas will auto-ignite. That is, the combustible gas will combust without the need for an igniter or pre-existing flame. Combustion of the combustible gas in the turbine assembly re-heats the working gas.

19 Claims, 4 Drawing Sheets

REHEAT COMBUSTOR FOR GAS COMBUSTION TURBINE

BACKGROUND OF THE INVENTION

1. Field of the Invention

This invention relates to turbines for a combustion turbine power plant and, more specifically, to a secondary combustor which re-heats the working gas as the working gas passes through the turbine assembly.

2. Background Information

A conventional combustible gas turbine includes a compressor assembly, a combustor assembly, a transition section, and a turbine assembly. The compressor assembly compresses the ambient air. The combustor assembly combines the compressed air with a fuel and ignites the mixture creating a working gas. The working gas travels through the transition section to the turbine assembly. The turbine assembly is structured to have a cross-sectional area that increases as the working gas moves downstream. Also, within the turbine assembly are a series of rows of stationary vanes and rotating blades. Each pair of rows of vanes and blades is called a stage. Typically, there are four stages in a turbine assembly. The rotating blades are coupled to a shaft. As the working gas expands through the turbine assembly, the working gas causes the blades, and therefore the shaft, to rotate.

The power output for the turbine is proportional to the temperature of the working gas in the turbine assembly. That is, the higher the temperature of the working gas, the greater the power output of the turbine assembly. To ensure that the working gas has energy to transfer to the rotating blades within the final stage, the working gas must be at a high working temperature as the gas enters the turbine assembly. For modern engines, the working temperature, or turbine inlet temperature, is about 2800° F. (1537° C.). The temperature of the working gas is reduced. However, as the working gas passes through each stage of the turbine assembly. Thus, the power output generated from the later stages is less than optimal. The amount of power output for the later stages of the turbine assembly could be increased if the temperature of the working gas within the later stages was increased.

The easiest method of increasing the temperature of the working gas in the later stages of the turbine assembly is to increase the temperature of the working gas in the combustor assembly. Unfortunately, $NO_x$ is generally produced in high temperature (2650° F./1455° C. or greater) flame regions of the combustor assembly and the transition to the turbine assembly. The quantity of $NO_x$ produced increases as the temperature in the combustor increases. Additionally, increasing the operating temperature of the combustor increases the thermal stress on the components thereby requiring that the components be manufactured to withstand the higher temperatures. This adds to the manufacturing costs of the components.

Alternatively, discrete secondary combustors could be used. Unfortunately, undesirable amounts of $NO_x$ may be formed in such secondary combustors. This is because if the working gas spends a longer residence time at high (>2650° F./1455° C.) temperatures, $NO_x$ is formed by reaction of $N_2$ and $O_2$ in the gas.

There is, therefore, a need for a device to reheat the working gas within the turbine assembly but does not allow the working gas to remain at a high (>2650° F./1455° C.) temperature for a significant amount of time.

There is a further need for a working gas re-heating device having a low residence time flame.

There is a further need for a working gas re-heating device which is compatible with existing combustion turbines.

There is a further need for a working gas re-heating device which incorporates present technology used on combustion turbines.

SUMMARY OF THE INVENTION

These needs, and others, are satisfied by the present invention which provides a secondary combustor assembly within the stationary vanes and/or rotating blades within the turbine assembly. The secondary combustor is located within one or more stages of the turbine assembly and re-heats the working gas as the working gas passes through that stage of the turbine assembly.

The secondary combustor supplies combustible gas through the stationary vanes and/or the rotating blades in a turbine assembly. Many turbine assemblies presently include internal channels within the rotating blades and/or stationary vanes to allow a cooling gas, or steam, to pass therethrough. The channels may have openings to allow the cooling gas to join the working gas. The present invention provides a combustible gas, such as, but not limited to, natural gas, through the internal channels of the stationary vanes and/or rotating blades. As the combustible gas exits openings along the trailing edges of the stationary vanes and/or rotating blades, the combustible gas will spontaneously combust, or "auto-ignite," upon being exposed to the heated working gas. The flame produced in the rotating blade and/or stationary vane portion of a turbine has a low residence time (typically 5 msec. or less), yet still provides enough energy to heat the working gas as the working gas passes through that stage of the turbine assembly.

The openings along the trailing edge have a diameter of less than about 0.125 inch. The high temperature flames extending from these openings are micro-diffusion flames. That is, the flames have small volumes, and therefore residence time of working gas within the flame region is very short. No significant amount of NOx is created in the rotating blade and/or stationary vane portion of the turbine due to the minimal amount of time the working gas is heated above 2650° F./1455° C.

One embodiment of the invention only has a secondary combustor located in the first row of vanes or blades. That is, the combustible gas is only channeled to the first row of vanes or blades. Another embodiment of the invention includes a secondary combustor in a plurality of the rows of vanes and/or blades. When the combustible gas is introduced into various points in the turbine assembly, the working gas is reheated in stages at each of these points. A third embodiment incorporates an additional stage in the turbine assembly. That is, the turbine assembly has five stages. In this embodiment, the compressor is structured to provide greater compression and the secondary combustor is located in the second stage of the turbine assembly.

The secondary combustor further provides advantage of having a primary combustion assembly which operates at a temperature approximately 500° F.–300° F. (260° C.–149° C.) lower than prior combustion turbines. A cost-savings can be realized by designing the combustor assembly and transition section to operate at the lower temperature. However, this device may also be used with current combustion turbine power plants which incorporate cooling passageways in the rotating blades and/or stationary vanes that are open to the working gas flow path.

DESCRIPTION OF THE PREFERRED EMBODIMENT

Figure 1:
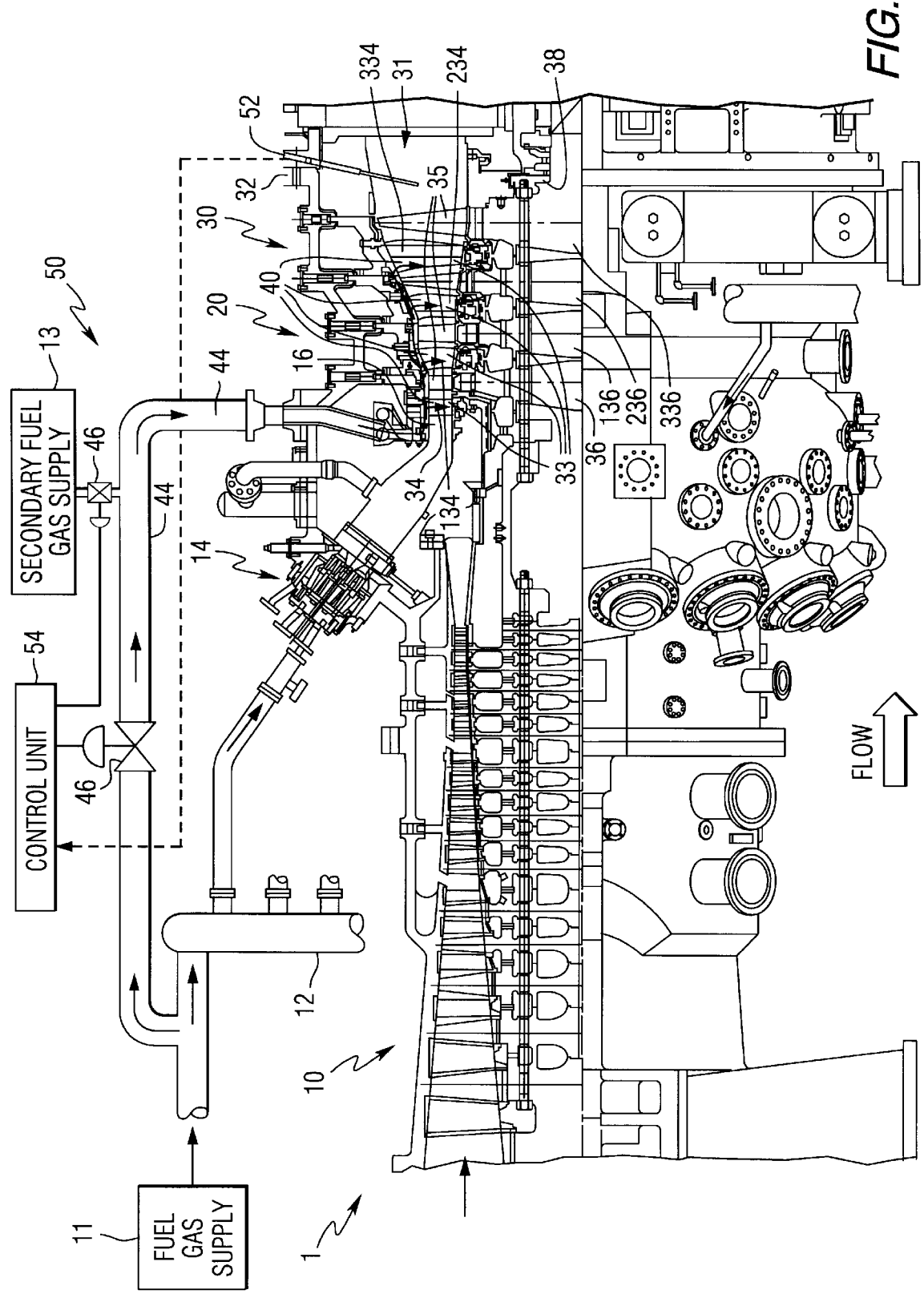
FIG. 1 is a partial cross section of a combustion turbine showing the combustor assembly, the transition section, and the turbine assembly having a secondary combustor assembly among the turbine vanes.

As shown in FIG. 1, a combustion turbine power plant 1 includes a compressor assembly 10, a combustible gas source 11, a fuel delivery system 12, a primary combustor assembly 14, a transition section 16, a secondary combustor assembly 20 and a turbine assembly 30. The secondary combustor assembly 20 is located within the vanes 33 and blades 34 (described below) in the turbine assembly 30.

In operation, the compressor assembly 10 inducts ambient air and compresses the air. The compressed air is channeled into the primary combustor assembly 14. The primary combustor assembly 14 is coupled to the combustible gas source 11 through the fuel delivery system 12. In the primary combustor assembly 14, a combustible gas and the compressed air are mixed and ignited, thereby forming a working gas. The working gas is channeled from the primary combustor assembly 14 into transition section 16. A transition section 16 is coupled to both the primary combustor assembly 14 and the turbine assembly 30.

Figure 2:
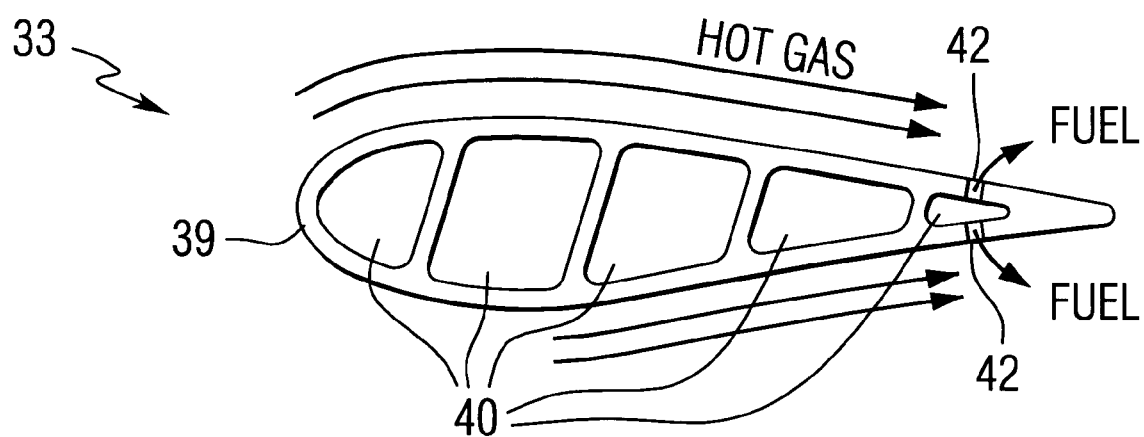
FIG. 2 is a cross sectional view of a vane incorporating fuel injection openings.

A turbine assembly 30 includes an elongated outer casing 32 defining a channel 31 which is the flow path for the working gas. A plurality of stationary vanes 33 are disposed in a first row 34 within the casing 32. There may be additional rows 134, 234, 334 of stationary vanes 33. A plurality of rotating blades 35 are disposed in at least one row 36, and extend circumferentially from a central shaft 38. There may be additional rows 136, 236, 336 of rotating blades 35. A shaft 38 extends axially within casing 32. The rows of rotating blades 36 are spaced to fit within the interstices between the rows of stationary vanes 34, 134, 234, 334. As shown in FIG. 2, each of the vanes 33 or blades 35 have airfoil shaped bodies 39.

The secondary combustor assembly 20 is structured to reheat the working gas within the turbine assembly 30. The secondary combustor 20 assembly re-heats the working gas by injecting a combustible gas into the elevated temperature working gas. The combustible gas may originate from the combustible gas source 11 or a secondary combustible gas source 13. The secondary combustible gas source 13 may supply the same combustible gas as the combustible gas source 11 or a different combustible gas. The secondary combustible gas source 13 is coupled to the fuel delivery system 12.

The secondary combustor assembly 20 includes a plurality of openings disposed among the vanes 33 and/or blades 35 which are coupled to the combustible gas source 11. The combustible gas is injected into the working gas flow stream. As the combustible gas is injected into the elevated temperature working gas, the combustible gas will auto-ignite. That is, the combustible gas will combust without the need for an igniter or pre-existing flame.

Figure 3:
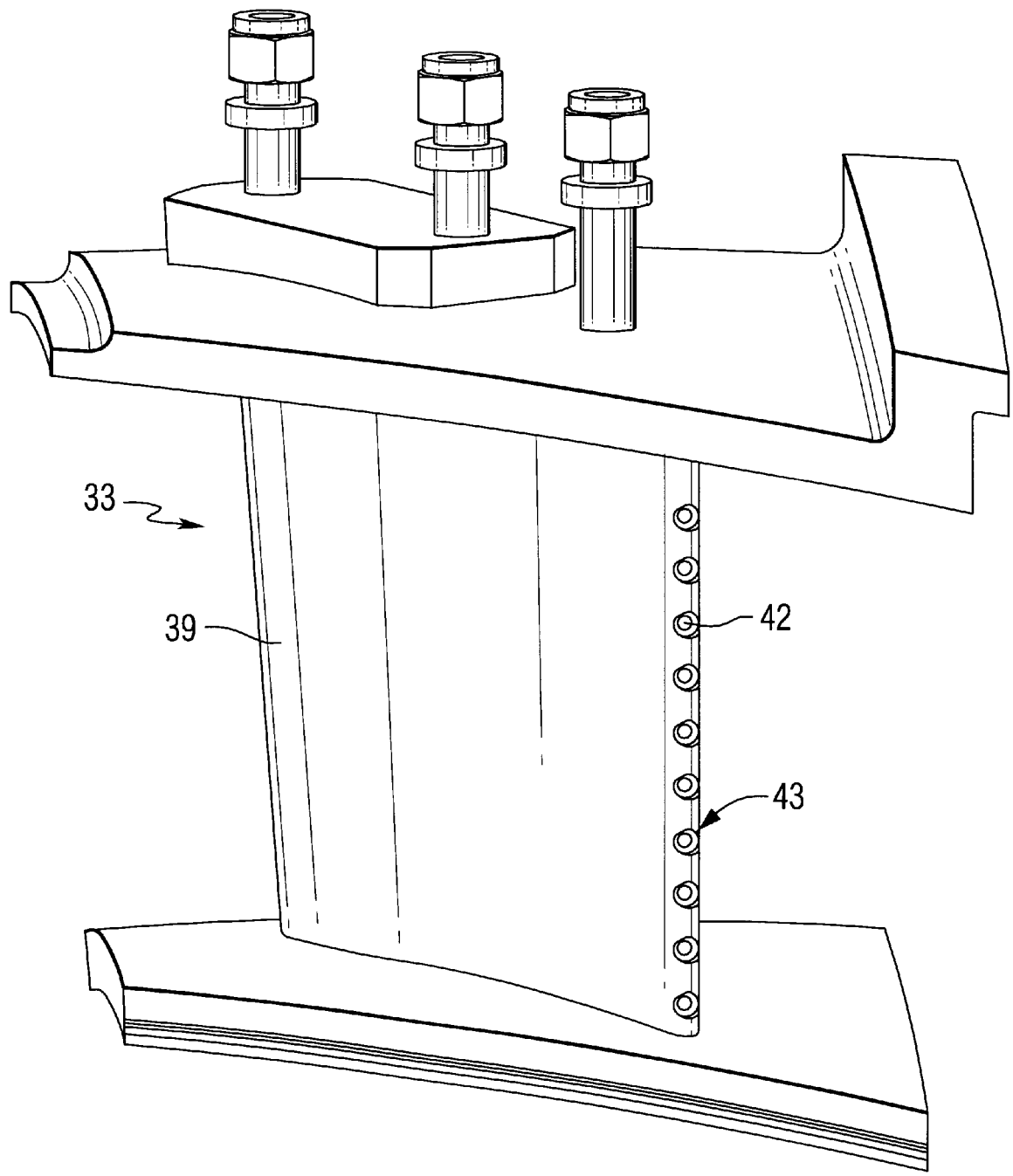
FIG. 3 is an isometric view of a vane according to the present invention.

The secondary combustor assembly 20 also includes a secondary combustible gas pipe assembly 44 and internal channels 40 within the airfoil bodies 39 of the vanes 33 and/or blades 35. The internal channels 40 are coupled to openings 42 along the trailing edge of the airfoil bodies 39. The openings 42 are sized to create micro-diffusion flames and are about 0.125 or less inches in diameter. There are about twenty openings 42 spaced along the trailing edge of each body 39. As shown in FIG. 3, the openings 42 may be counterbored. The counterbore about the openings 42 creates a flame holder 43 which is structured to shelter and stabilize the flame caused by the auto-ignition of a combustible gas.

As shown in FIG. 1, the internal channels 40 of the stationary vanes 33 and/or rotating blades 35 are coupled to the fuel delivery system 12 by pipe 44 or other such passageway. Combustible gas may pass through the secondary combustible gas pipe assembly 44 and into the internal channels 40. By coupling the fuel delivery system 12 to the internal channels 40, there is a continuous path between the combustible gas source 11 and/or the secondary combustible gas source 13 and the openings 42 in the vanes 33 and/or blades 35. In one embodiment, the combustible gas is provided to the first row of vanes 34 in the turbine assembly 30. The first row of vanes 34 is adjacent to transition section 16 and is, effectively, the beginning of the turbine assembly 30.

The secondary combustible gas pipe assembly 44 may include at least one valve 46 for controlling the amount of combustible gas passing therethrough and a control system 50. The control system 50 includes at least one sensor 52, such as a temperature sensor, pressure sensor, or mass flow sensor, which gathers data relating to the condition of the working gas. The sensor 52 converts the data into an electrical output signal which is provided to a control unit 54. The control unit 54 receives the output signal from the sensor 52 and determines a parameter indicative of a characteristic, e.g. the temperature, of the working gas compared to a selected standard. The control unit 54 is also coupled to the valve 46 and will increase or decrease the flow of combustible gas through the valves 46 relative to the results of the comparison, to achieve a working gas temperature approximately equal to the selected standard.

In operation, the compressor assembly 10 compresses ambient air and delivers the compressed air to the primary combustor assembly 14. A combustible gas travels from the combustible gas source 11 through the fuel delivery system 12 to the primary combustor assembly 14 where it is combined with compressed air and ignited creating a working gas having an elevated temperature. A portion of the combustible gas from the combustible gas source 11, or combustible gas from the secondary combustible gas source 13, travels from the fuel delivery system 12 through the pipe 44 to the internal channels 40 of the stationary vanes 33 and/or rotating blades 35. As the combustible gas travels through the internal channels 40 of the stationary vanes 33 and/or rotating blades 35, the combustible gas absorbs heat thereby cooling the stationary vanes 33 and/or rotating blades 35. When the combustible gas reaches one of the openings 42, it passes into the working gas stream. When the combustible gas enters the working gas stream it will auto-ignite thereby re-heating the working gas. Preferably, the openings 42 are sized to create micro-diffusion flames having a low residence time, preferably less than 0.5 msec.

In the primary combustor assembly 14, the working gas is heated to the normal turbine inlet temperature. The working gas maintains this temperature through transition section 16. As the working gas entered the turbine assembly 30, the working gas passes through the first row of vanes 34 and first row of blades 36. In the first row of vanes 34 and first row of blades 36, the temperature of the gas is reduced as energy is transferred to the rotating blades 36 and as the cross-sectional area of the turbine assembly increases. The secondary combustor assembly 20 injects a combustible gas into the working gas, preferably from the first row of vanes 34 or blades 35. At a temperature of about 2000° F. or more, the combustible gas will auto-ignite producing a micro-diffusion flame. The micro-diffusion flame heats the working gas approximately to the turbine inlet temperature level just as the working gas enters the majority of the turbine assembly 30. The heating of the working gas by the secondary combustor assembly 20 may be controlled by the valve 46 working in conjunction with the control system 50. Thus, the reduction in temperature of the working gas as it passes through the turbine assembly 30 is countered by the energy added to the working gas by the secondary combustor 20.

An existing combustion turbine power plant can be adapted to have a secondary combustor assembly 20 by isolating the internal channels 40 in the first row of vanes 34 from the internal channels 40 within the other rows of vanes 134, 234, 334. This may require replacing the first row of vanes 34 with new vanes 34 which have channels 40 which do not communicate with the channels 40 in other rows of vanes 134, 234, 334. The channels 40 in the first row of vanes 34 are coupled to the combustible gas pipe assembly 44. The channels 40 in the subsequent rows of vanes 134, 234, 334 may still be coupled to a cooling steam source (not show) if desired.

Alternatively, in a second embodiment, the combustible gas pipe assembly 44 may be coupled to the cooling steam and/or air channels within vanes 33 and/or blades 35 of the prior art. As the channel 40 extends through each row of vanes 34, 134, 234, 334 or blades 36, 136, 236, 336, the combustible gas is supplied to each row of vanes 34, 134, 234, 334 or blades 36, 136, 236, 336. In this configuration, the combustible gas auto-ignites in the space after each row of vanes 34, 134, 234, 334 and/or blades 36, 136, 236, 336, thereby re-heating the working gas. By re-heating the working gas after each or most of the row of vanes 34, 134, 234, 334 and/or blades 36, 136, 236, 336, it is possible to start with a lower temperature in the primary combustor assembly 14. At each location where the combustible gas is injected into the working gas, the working gas temperature is raised about 200° F./93.3° C. While the combustable gas travels through the cooling steam and/or air channels within vanes 33, the combustable gas will absorb heat thereby cooling the vanes 33 or blades 35.

Figure 4:
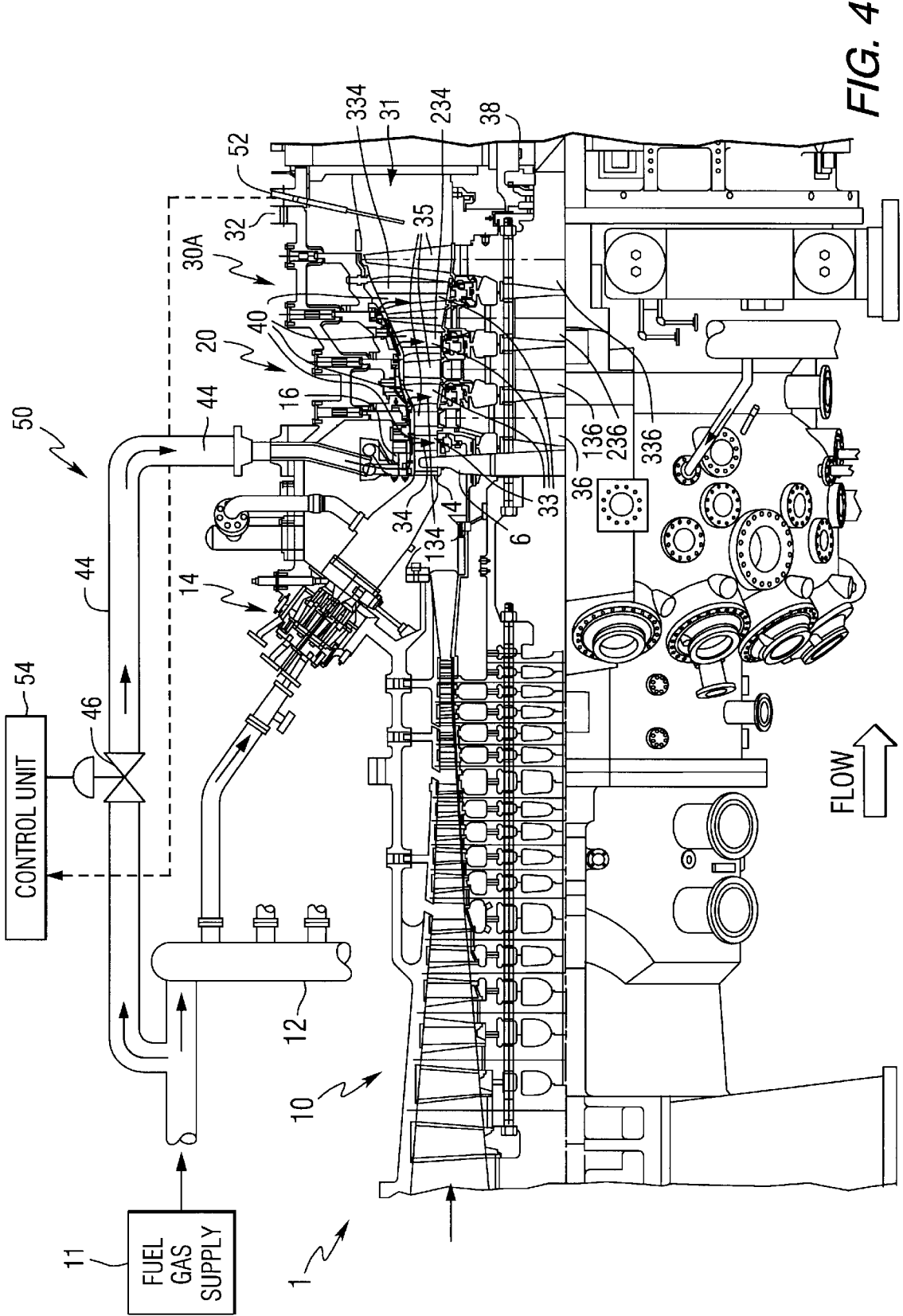
FIG. 4 is a cross-sectional view of an alternate embodiment.

As shown in FIG. 4, in another embodiment, an additional row of vanes 4 and blades 6 are incorporated into the turbine assembly 30A. That is, a typical turbine assembly has four stages of vanes 33 and blades 35. In this embodiment, there are five stages. The first stage is disposed at the upstream end of the turbine assembly 30A with sequentially numbered stages extending downstream. The additional stage has, preferably, a smaller diameter than the other stages and is located at the upstream end of the turbine assembly 30. That is, the last four rows of vanes 34, 134, 234, 334 and blades 36, 136, 236, 336 have dimensions similar to those stages associated with a four stage turbine assembly 30, as described above, and the additional stage of vanes 4 and blades 6 precedes the other stages in the flow stream. Additionally, in this embodiment, the compressor assembly 10 is structured to provide a greater pressure than a compressor assembly 10 associated with a four stage turbine assembly 30. The secondary combustor assembly 20 is preferably located within the vanes 34 and blades 36 of the second stage of the turbine assembly 30. The remaining aspects of this embodiment are similar to those described above regarding the first embodiment.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A combustion turbine comprising:
   a combustible gas source;
   a compressor assembly structured to compress ambient air;
   a primary combustor assembly coupled to said compressor assembly and, via a primary combustible gas pipe assembly, to said combustible gas source which mixes compressed air and combustible gas and ignites the mixed gasses thereby creating a working gas with an elevated temperature;
   a transition section coupled to said primary combustor assembly;
   a turbine assembly coupled to said transition section, said turbine assembly having a plurality of stationary vanes and rotating blades disposed in rows within a flow path, said blades and vanes having bodies with internal channels and being characterized by a plurality of openings on said bodies allowing fluid communication between said internal channels and said flow path;
   a secondary combustor structured to heat the working gas within the turbine assembly including a secondary combustible gas pipe assembly coupled to said combustible gas source and said internal channels; and
   whereby said combustible gas may enter the flow path through the plurality of openings in the bodies and auto-ignite upon contact with the elevated temperature working gas.

2. The combustion turbine of claim 1, wherein said plurality of openings within said secondary combustor totals about 20 openings.

3. The combustion turbine of claim 1 wherein each opening has a diameter of about 0.125 inch or less.

4. The combustion turbine of claim 3, wherein said bodies are airfoils and said openings are located on the trailing edge of said bodies.

5. The combustion turbine of claim 3, wherein said trailing edge includes a counterbore disposed about each opening structured to shelter and hold a small flame.

6. The combustion turbine of claim 1, wherein said secondary combustible gas pipe assembly includes a means to control the flow of combustible gas.

7. The combustion turbine of claim 6, wherein said means to control the flow of combustible gas is a valve.

8. The combustion turbine of claim 7, wherein:
   said secondary combustible gas pipe assembly includes a control system which opens or closes said valve;
   said control system includes:
      a sensor disposed within said turbine assembly which provides an electric output;
      a control unit coupled to said valve and coupled to said sensor; and
      said control unit receiving said electric output from said sensor and determining a parameter indicative of a characteristic of the working gas compared to a selected standard and increases or decreases the flow of combustible gas through said valve relative to the results of the comparison, to achieve a working gas temperature approximately equal to the selected standard.

9. The combustion turbine of claim 8 wherein the parameter detected is the temperature of the working gas.

10. The combustion turbine of claim 1 wherein the secondary combustor assembly comprises:
a first row of vanes and a first row of blades.

11. The combustion turbine of claim 10, wherein said plurality of openings within said secondary combustor totals about 20 openings.

12. The combustion turbine of claim 10 wherein each opening has a diameter of about 0.125 inch or less.

13. The combustion turbine of claim 12, wherein said bodies are airfoils and said openings are located on the trailing edge of said bodies.

14. The combustion turbine of claim 13, wherein said trailing edge includes a counterbore disposed about each opening.

15. The combustion turbine of claim 14, wherein said secondary combustible gas pipe assembly includes a means to control the flow of combustible gas.

16. The combustion turbine of claim 15, wherein said means to control the flow of combustible gas is a valve.

17. The combustion turbine of claim 16, wherein:
said secondary combustible gas pipe assembly includes a control system which opens or closes said valve;
said control system includes:
a sensor disposed within said turbine assembly which provides an electric output;
a control unit coupled to said valve and coupled to said sensor; and
said control unit receiving said electric output from said sensor and determining a parameter indicative of a characteristic of the working gas compared to a selected standard and increases or decreases the flow of combustible gas through said valve relative to the results of the comparison, to achieve a working gas temperature approximately equal to the selected standard.

18. The combustion turbine of claim 17 wherein the parameter detected is the temperature of the working gas.

19. The combustion turbine of claim 17 wherein:
said turbine assembly having a plurality of rotating blades and stationary vanes disposed as a series of stages within a flow path;
said turbine assembly having five stages of vanes and blades with a first stage disposed at the upstream end of said turbine assembly with sequentially numbered stages extending downstream;
said blades and vanes of a second stage having bodies with internal channels;
a secondary combustible gas pipe assembly coupled to said combustible gas source and said internal channels;
a plurality of openings on said bodies allowing fluid communication between said internal channels and said flow path; and
whereby said combustible gas may enter the flow path through the plurality of openings in the bodies and auto-ignite upon contact with the elevated temperature working gas.

* * * * *